United States Patent
Blackshear

Patent Number: 5,562,136
Date of Patent: Oct. 8, 1996

[54] FREE FLOATING ROUTER GUIDE

[76] Inventor: Laton Blackshear, 270 Rancho Del Oro Dr., Apt. 189, Oceanside, Calif. 92057-7317

[21] Appl. No.: 347,514

[22] Filed: Nov. 30, 1994

[51] Int. Cl.$^6$ .............................. B27C 5/10; B27M 3/00
[52] U.S. Cl. ........................ 144/144.1 R; 144/144.51; 144/372; 144/134.1; 144/135.2; 409/125; 409/130
[58] Field of Search ................. 144/134 R, 134 A, 144/137, 144 R, 144.5, 371, 372, 134.1, 135.2, 144.1, 144.51; 409/125, 130, 182

[56] References Cited

U.S. PATENT DOCUMENTS

| | | | |
|---|---|---|---|
| 3,442,309 | 5/1969 | Jentsch | 144/144 R |
| 3,541,922 | 11/1970 | Dunlap | 144/144 R |
| 3,865,162 | 2/1975 | Schmidt | 144/144 R |
| 4,095,633 | 6/1978 | Kimball et al. | 144/144 R |
| 4,281,694 | 8/1981 | Gorman | 144/134 D |
| 4,355,557 | 10/1982 | Mecsey | 144/144 R |
| 4,630,656 | 12/1986 | Collins | 144/134 D |
| 4,735,531 | 4/1988 | Boerckel et al. | 144/134 D |
| 5,080,152 | 1/1992 | Collins et al. | 144/134 D |
| 5,129,436 | 7/1992 | Curtis et al. | 144/144 R |
| 5,299,609 | 4/1994 | Wedler | 144/134 D |

*Primary Examiner*—W. Donald Bray
*Attorney, Agent, or Firm*—Thomas J. Tighe

[57] ABSTRACT

A router guide to enable a router to be free floating within selected planes above a workpiece. A support platform is adjustable in height and reciprocally movable in orthogonal directions, within ranges, allowing it to be easily moved to any position over the workpiece for routing. By use of the guide a router can be free floating for free-hand control, can be made to follow a template, or can be set for movement only in a lateral or longitudinal direction, relatively. The platform on which a router can be mounted is movably supported on two parallel bars for lateral movement which are movably supported on two parallel bars for longitudinal movement which are supported by adjustable legs. An adjustable arm extending laterally from the support allows the guide to follow a template outline, or by attaching a peg in the end of the arm the guide can follow a template groove.

18 Claims, 4 Drawing Sheets

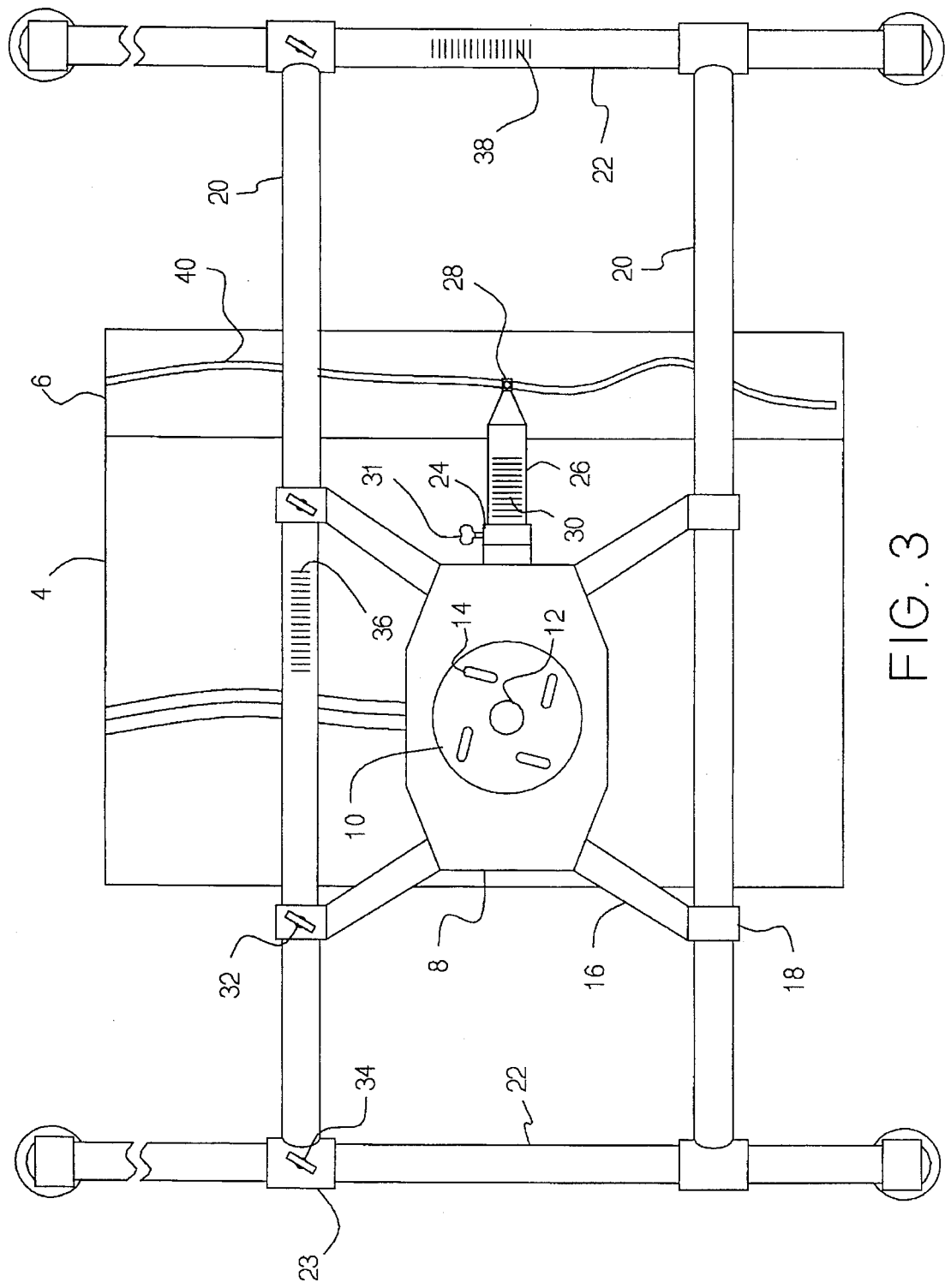

FREE FLOATING ROUTER GUIDE

BACKGROUND OF THE INVENTION

This invention relates in general to router guides for use in positioning and guiding pre-existing routers in the routing and cutting of workpieces, and in particular to guides that enable a router to float freely within a range over the workpiece.

Routing by means of hand-held routers following templates is well known. Typically, straight edges or curvilinear shaped edges are clamped to a workpiece and the router is pressed against the straight edge or curvilinear shaped edge to make a like cut in the workpiece. Also, a router may employ a positioner arm that follows an edge or a groove in a template, allowing the router to make a cut which follows the edge or template groove. These methods have the disadvantage of requiring extreme concentration and control of the hand-held router in order to ensure the router accurately follows the desired path. Almost inevitably, at some point within the operator's reach, a momentary loss of control will occur, leaving an unwanted cut in the workpiece. A router guide, such as those in the Davison U.S. Pat. No. 4,742,853 and the Meinhart U.S. Pat. No. 5,052,454 help with this problem by making it easier to use templates and guide surfaces but still leave the operator with the problem of trying to control a hand-held router against a template of some sort. Additionally, the depth of cut must be set for these guides by adjusting the router bit in the router, or by means of shims or spacers for the router to move on as it makes its cuts. The Davison router guide is primarily for making dado type slots, such as those used for shelving. The Cotton U.S. Pat. No. 4,194,543 is a router guide which does away with the hand-held router disadvantages, but by its design is primarily for commercial use in making parallel longitudinal and lateral cuts in large panels or doors automatically by an indexing apparatus in which stops must be set at locations that have to be pre-determined. It was not designed to follow a template to make curvilinear cuts.

This invention overcomes these disadvantages.

Other advantages and attributes of this invention will be readily discernable upon a reading of the text hereinafter.

SUMMARY OF THE INVENTION

This invention presents a guide for routing a workpiece by a router. As used in this document, the term "router" refers to, and means, hand-held machines for routing, cutting, drilling, abrading, and otherwise machining a workpiece; and the terms "rout" and "routing" refer to, and mean, the machining done by a "router." In particular, this invention enables a router to be free floating and thus more easily directed by a template to rout a workpiece according to the template and/or to rout linearly or curvilinearly in any direction, or to rout selected areas. This invention can also be used to easily and accurately machine a workpiece linearly, for example one or more parallel linear cuts, in two orthogonal directions over a selected plane, with or without the use of templates. Additionally this invention provides the ability of setting the depth of machining easily and accurately without having to adjust the machine, e.g. as by raising or lowering a router bit.

It is an object of this invention to overcome the disadvantages of hand-held routers by mounting a router on a platform that is free to move in any direction within a selected plane within a range, and which can be made to follow a template accurately with minimum effort.

A further object of this invention is to provide a free floating router guide which, in conjunction with a router, permits the operator to easily and accurately rout cuts in a workpiece in any direction, linearly or curvilinearly, and over any area by following a template or other guide.

Another object is to provide such free floating router guide which can easily and accurately rout cuts longitudinally and/or laterally relative to a workpiece.

A further object is to provide such free floating router guide of this invention which can easily adjust the depth of cut.

A further object is to provide such free floating router guide which can be used to rout cuts easily and accurately at a particular location, or in a plurality of locations.

A further object is to provide such free floating router guide which will accept various widths and thicknesses of workpieces whose lengths are not limited by the apparatus.

These objects, and other objects and attributes, expressed or implied, will become apparent upon the reading of the text hereinafter.

BRIEF DESCRIPTION OF THE DRAWINGS

FIG. 3 is a plan view of the router guide template and workpiece of FIG. 1.

DESCRIPTION OF THE PREFERRED EMBODIMENT

Figure 1B:
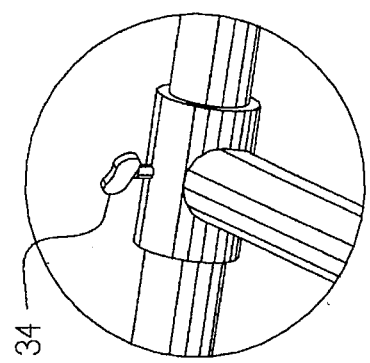
FIGS. 1A and 1B are enlarged views of portions of FIG. 1 defined by circles 1A and 1B, respectively.
Figure 1A:
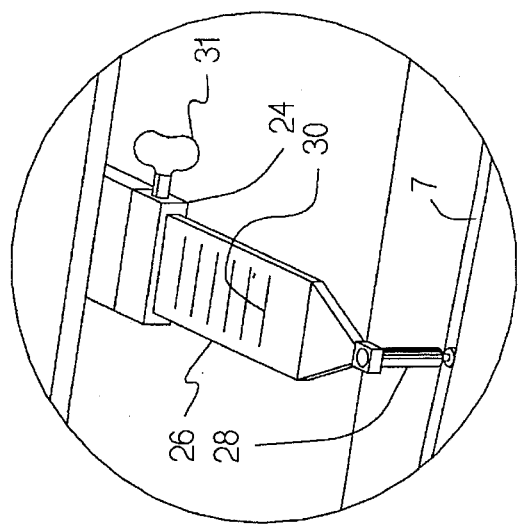
Figure 1:
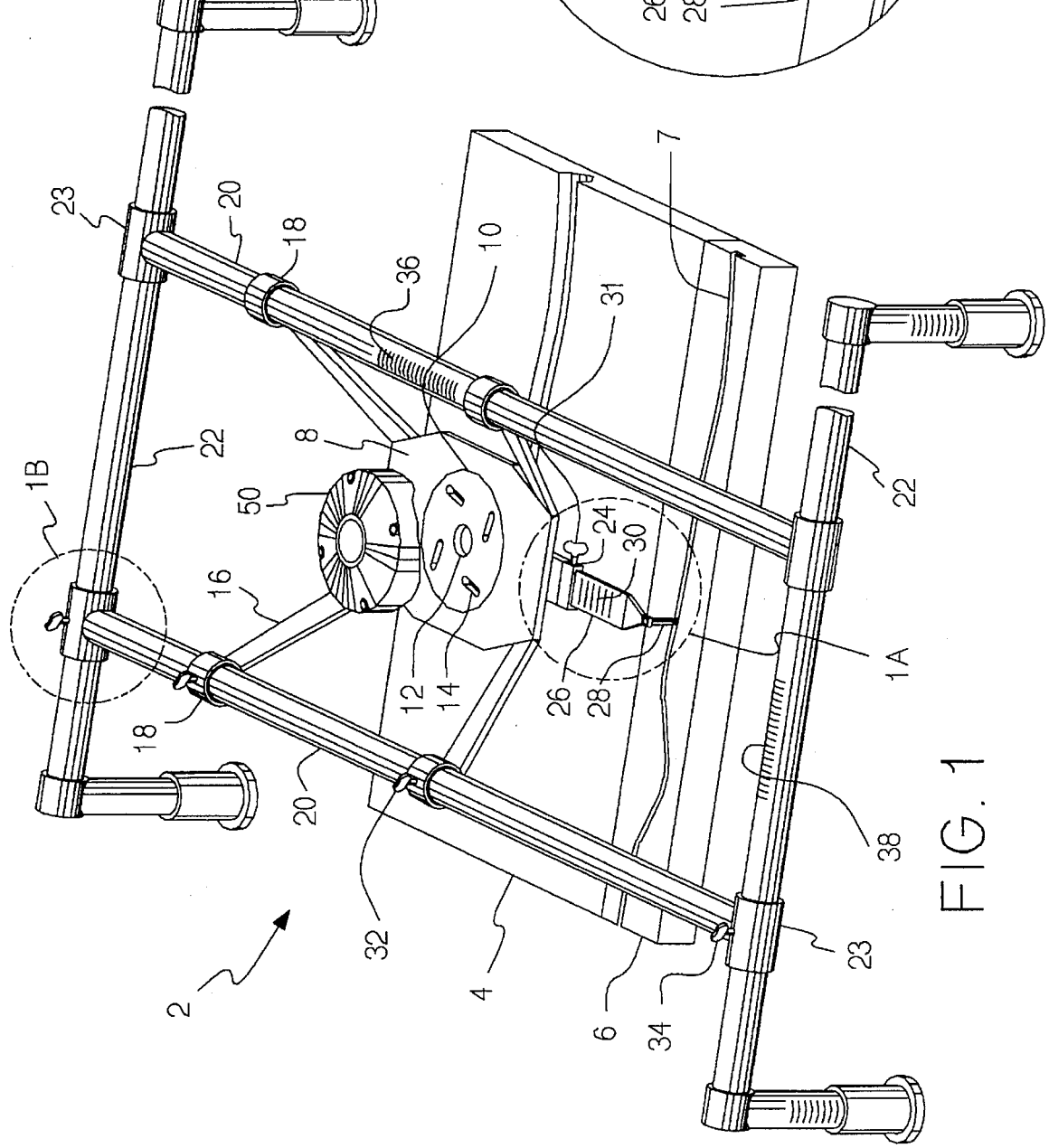
FIG. 1 is a fragmentary pictorial view of a guide according to this invention illustrating the invention adapted for use with a router in conjunction with a template and workpiece on a planar work surface.
Figure 2:
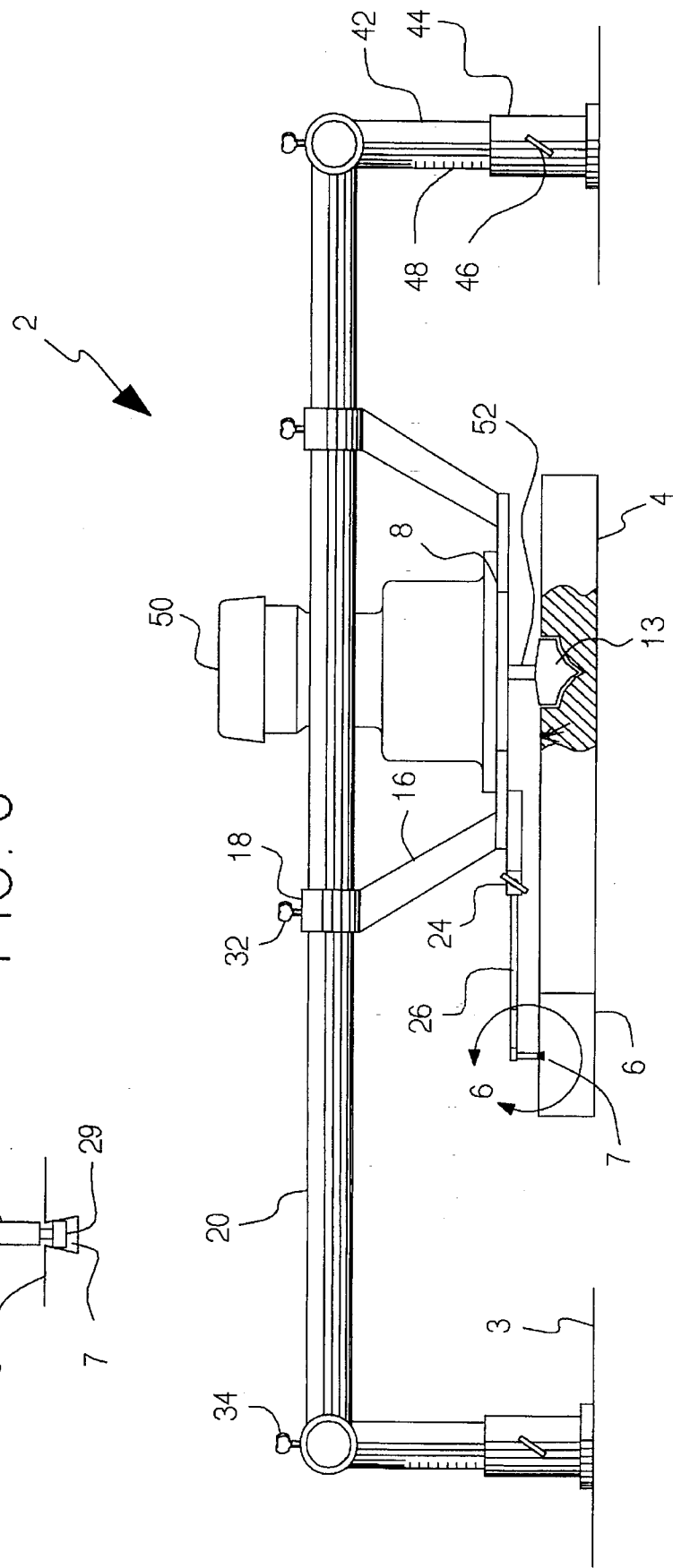
FIG. 2 is a side elevational view of the router guide of FIG. 1.

Referring now to FIGS. 1–3 and showing only that portion of the router guide which is necessary for an understanding of the invention, a router guide, generally designated 2, is resting on a planar surface 3, such as a work bench, along with a workpiece 4 and a template 6. The template, as illustrated, is an elongated slat defining an open, upward facing curvilinear groove 7. It should be understood that a template according to this invention need not define just a curvilinear slot, but can define any variety of patterns and areas, and need not be in slat form. A platform 8 supports a centrally disposed adapter 10 for mounting a conventional hand-held router. The adapter defines a central hole 12 sufficient in size to allow the machining tool of a router, e.g. a bit 13, to freely pass through the support platform when the router is mounted on the adapter. The adapter 10 further defines a plurality of mounting holes 14 for removably fastening a router to the support platform by means of fasteners, e.g. screws, bolts, or such. The mounting holes, illustrated as slots, are so disposed and configured as to accommodate a wide variety of routers. The support platform 8 is centrally disposed between two parallel lateral guide bars 20 and is suspended therefrom by a plurality of rigid support arms 16 which are connected to respective slides 18, illustrated as guide bearings, slidably mounted on the lateral guide bars. (The term "lateral" and all other directional terms used herein have been arbitrary chosen for purposes of clarity of description only and should not be interpreted to define an absolute or necessary orientation of the invention.) As illustrated, the support platform has four support arms 16 extending from platform corners to respective slides 18 on adjacent lateral guide bars. This arrangement provides freedom for movement of the platform in either lateral direction at least to the extents of the lateral guide bars. The lateral guide bars co-extend between, and are supported by, two parallel longitudinal guide bars 22. Each end of each lateral guide bar is connected to a sleeve 23 which is slidably mounted on a longitudinal guide bar. This arrangement provides freedom for movement of the support platform in either longitudinal direction at least to the extents of the longitudinal guide bars. The combination of lateral freedom of movement and longitudinal freedom of movement to enable the support platform to be positioned over any point of the workpiece 4 within the extents of the guide bars.

Referring again to FIGS. 1–3, adjustably extending from a side of the platform 8 is a positioner arm 26 mounted in a positioner arm guide 24. As illustrated the positioner arm guide is affixed to a lower surface of the support platform 8 and oriented so that the positioner arm adjustably extends laterally, generally parallel to the lateral guide bars 20. Preferably the positioner arm's adjustable movement is along the lateral axis of the platform which also passes through the center of the adapter hole 12. A guide peg 28, preferably replaceable, is attached to the end of the positioner arm remote from the router platform. Preferably the guide peg extends downwardly and is perpendicular to the mounting plane of the router and is laterally aligned with the center of the router bit hole. It should be understood that the peg could extend upwardly if the template was positioned higher, which it can be, than the support platform. The positioner arm has graduations 30, illustrated to be upward-facing, for operator use in adjusting the extent of the positioner arm to set the guide peg a selected distance from the router tool. There is also a positioner arm locking device 31 on the positioner arm guide 24 which can be used to lock the positioner arm 26 in a selected position, e.g. at a selected reading on the positioner graduations 30. As illustrated the positioner arm locking device is preferably, but not necessarily, a wing screw 31 engaged in a threaded bore (not shown) defined by the positioner arm guide. As the wing screw is tightened it bears against the positioner arm and clamps it in place.

Referring to FIGS. 1–3 again, the platform can be held in selected relation to the lateral guide bars by platform locking devices which are preferable, as illustrated, one or more wing screws 32 engaged in threaded bores (not shown) defined by respective lateral guide bearings 18. As a wing screw is tightened it bears against a lateral guide bar and thus holds its respective guide bearing in relation to the guide bar. The wing screws are shown mounted vertically but they could as well be mounted horizontally, either to the inside or the outside of the lateral guide bar 20 or any other suitable orientation or location. The lateral guide bars can also be held in relation to the longitudinal guide bars by lateral guide locking devices which are preferably, as illustrated, one or more wing screws 34 engaged in threaded bores (not shown) defined by respective lateral guide bar sleeves 23. As a wing screw is tightened it bears against a longitudinal guide bar and thus holds its respective lateral guide bar in relation to the longitudinal guide bar. The wing screws 34 are shown mounted vertically but they could as well be mounted in other orientations and locations. The clamps are used for quickly clamping or releasing the support platform in selected positions within the plane of the platform.

Referring again to FIGS. 1 and 3, preferably at least one of the lateral guide bars 20 has graduations 36 marked thereon and at least one of the longitudinal guide bars 22 has graduations 38 marked thereon. These graduations can be used by an operator without a template 6 to make straight router passes, either lateral or longitudinal, over a workpiece. For one example, by engaging the lateral guide locking devices 34 to fix the position of the lateral guide bars in selected relation to the longitudinal guide bars while leaving the platform locking devices 32 disengaged, the router platform is free to be moved only along the lateral guide bars, and a router when installed will only be able to make routing passes over the workpiece in a lateral direction. For another example, by using the longitudinal guide bar graduations 38 and the lateral guide locking devices 34, multiple lateral routing passes may be made in a workpiece. This is done by successively locking the lateral guide bars at selected positions on the longitudinal graduations 38 and making a lateral rout at each setting by moving the router platform in the lateral direction. For another example, by locking the platform in relation to the lateral guide bars, and by not locking the lateral guide bars in relation to the longitudinal guide bars, the router platform is free to be moved only along the longitudinal guide bars 22, and a router when installed will only be able to make routing passes over the workpiece in a longitudinal direction at the selected and fixed lateral position. For another example, by use of the lateral graduations 36 and the platform locking devices 32, multiple longitudinal routing passes may be made in a workpiece by successively locking the platform in place at selected positions on the lateral graduations and making a lateral rout in the workpiece at each setting by moving the router platform in the longitudinal direction.

Referring again to FIGS. 1–3, this invention can be used to have a router follow a template in any direction or pattern within a routing plane limited only by the limits of platform 8 travel. In template-following operation, a workpiece 4 and a template 6 are firmly held in their respective places, such as by clamping them to a work bench 3 by any suitable means such as by "C" clamps (not shown). For example, the template can be clamped aside the workpiece as illustrated. The platform is moved to position the router tool in line with a place where the pattern is to be routed. The position arm 26 is adjusted so that the guide peg 28 is inserted into a template groove 7 and clamped into position. With the guide bearings 18 and sleeves 23 left unlocked and free to slide, the router platform, and the router supported by it, will be directed by the guide peg which will be guided by the template groove as the lateral guide bars are pushed across the longitudinal guide bars.

Referring again to FIGS. 1 and 2, the longitudinal guide bars 22 are supported by extensible or telescoping legs, one leg connected to each end of the bars. Each leg has a telescoping member 42 that extends from the respective longitudinal bar end to which it is connected into a socket defined by a leg base 44 that rests on the work surface 3. The members 42 telescope in the sense that the extent each member projects from its respective base is adjustable. The depth of the routing passes by the router tool, when installed, can be set by adjustment of the extents that the telescoping members project above their respective leg bases. The telescoping members can be held in any selected position relative to their respective bases by use of locking devices 46 that can be, as illustrated, wing screws engaged in threaded bores (not shown) defined by respective leg bases. As each wing screw is tightened it bears against a respective telescoping member sufficiently to lock it in place. Leg height graduations 48 on each telescoping member can be used to repeatably set the legs to preselected heights, or for routing passes or patterns using different widths at different heights the legs can be set at one height for one router rout and then be set at a different height for a second rout. This procedure can be repeated for successive routing passes as needed.

Referring to FIG. 3, a router 50 is shown to be attached to the platform 8. A router bit 52 is routing the workpiece 4 according to a template groove 7 being followed by a guide peg 28 attached to a positioner arm 26 which in turn is connected to the router platform.

Figure 7:
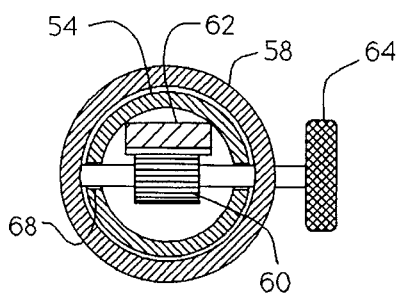
FIG. 7 is a cross-section taken along line 7—7 of FIG. 4.
Figure 4:
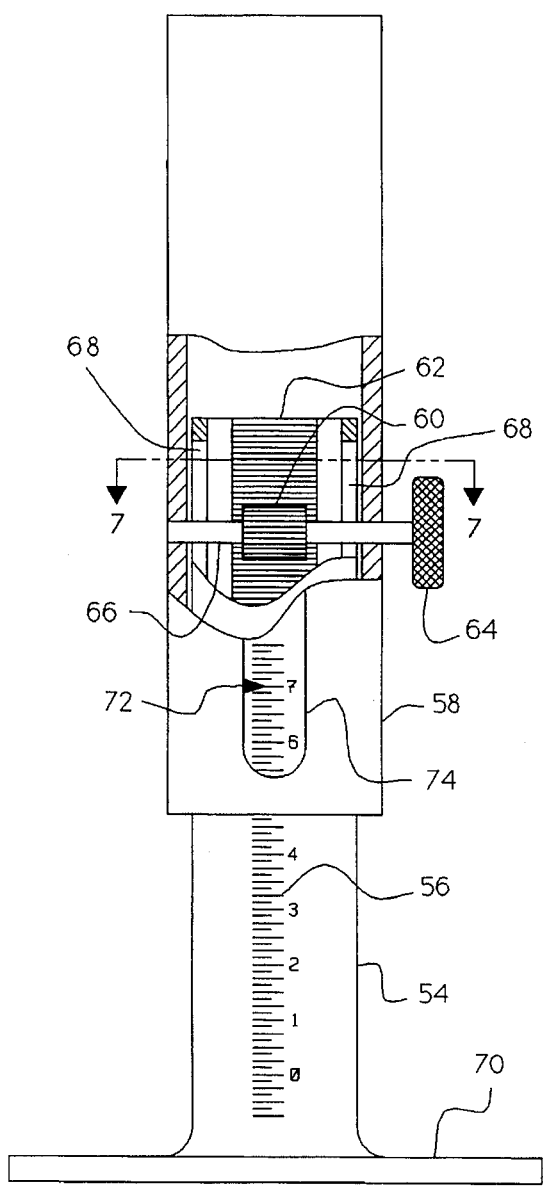
FIG. 4 is a partial cross-sectional view of one of the legs of the router guide showing an alternate embodiment of a height adjuster.
Figure 5:
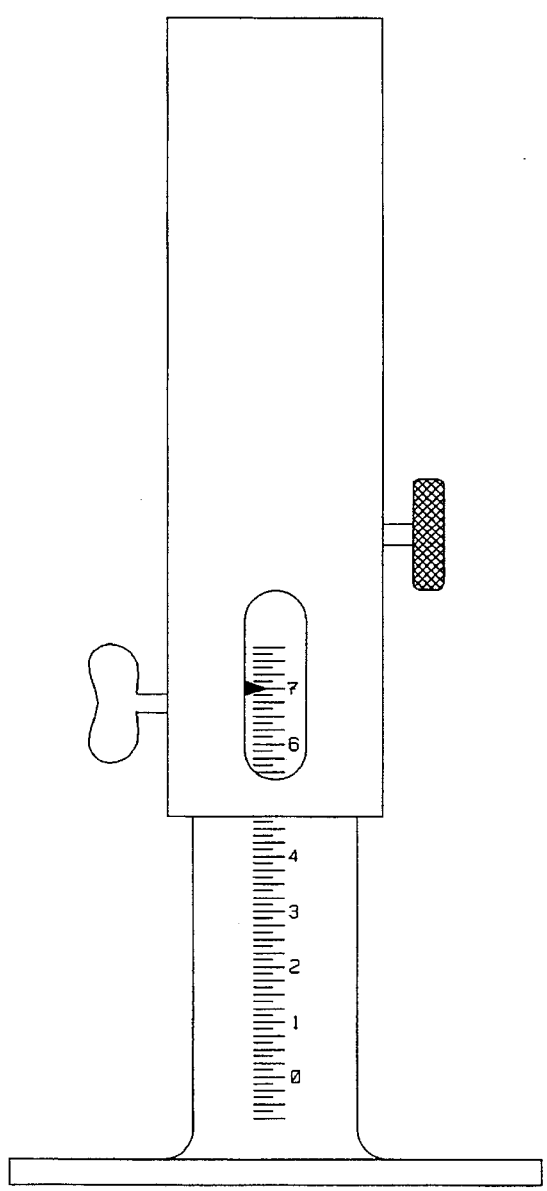
FIG. 5 is an elevational view of the leg of FIG. 4.

FIGS. 4, 5 and 7 illustrate an alternative embodiment of a longitudinal bar support leg. This leg has a tubular base 54 on which height graduations 56 are marked. A tubular sleeve 58 slides up and down on the base controlled by a pinion 60 engaged with a rack 62. The pinion is hand driven by means of knurled knob 64. The axle 66 of the pinion is journaled in the sleeve 58 and traverses opposing vertical slots 68 defined by the wall of the base 54. The base has a flange 70 for additional stability. A pointer 72 projects from the side of a slot 74 defined by the sleeve to allow visibility of the height graduations 56. When a height is selected the sleeve can be locked in place by the locking devices previously described.

Figure 6:
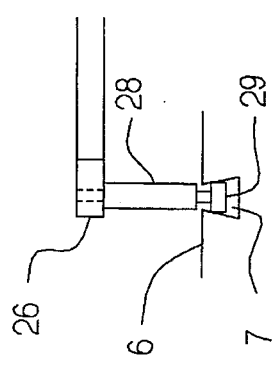
FIG. 6 is a detailed view of a template according to this invention illustrating the shape of a template groove with the template wheel therein.

FIG. 6 is a detailed view of the template groove 7 with a guide peg 28 and a template wheel 29 rotatably mounted on the end of the guide peg properly installed in the template groove. The template wheel, being free to rotate, reduces any fictional drag with the template groove as the guide peg and template wheel move through the template groove. The template groove is narrower at the top than at the bottom and has a width at the top that is less than that of the template wheel. This will keep the template wheel from coming out of the template groove once it is inserted at the start of the template groove. The sloped sides of the template groove will allow the template wheel to continue rotating, once started, and minimizes the play in the lateral direction. This allows the router to accurately rout the workpiece 4 in the shape of the template groove.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims. For example, the template pattern need not be linear but could also have various other patterns, including without limitation areas. If the template contains areas, the platform is moved laterally and longitudinally within the areas to rout corresponding areas of the workpiece. Also, the guide can be used for tools encompassed within the definition of router above by changing, for example, the adapter or adding another adapter.

I claim:

1. A router guide comprising:
   (a) means for supporting the router over a workpiece;
   (b) means for allowing free movement of the means for supporting, within a range, within a selected plane over the workpiece; and
   (c) means for selecting, within a range of parallel planes, a plane of movement for the means for supporting.

2. The router guide according to claim 1 further comprising means for selectively confining movement of the means for supporting to a selected line of travel within a selected plane.

3. The router guide according to claim 1 further comprising means for selectively confining movement of the means for supporting to selected alternative orthogonal lines of travel.

4. The router guide according to claim 1 further comprising template means for guiding movement of the means for supporting.

5. The router guide according to claim 1 further comprising means for mounting a variety of routers onto the means for supporting.

6. The router guide according to claim 2 further comprising template means for guiding movement of the means for supporting.

7. The router guide according to claim 2 further comprising means for mounting a variety of routers onto the means for supporting.

8. The router guide according to claim 3 further comprising template means for guiding movement of the means for supporting.

9. The router guide according to claim 3 further comprising means for mounting a variety of routers onto the means for supporting.

10. The router guide according to claim 4 wherein the template means comprises:
    (a) a template; and
    (b) means, connected to the means for supporting, for following the template.

11. The router guide according to claim 6 wherein the template means comprises:
    (a) a template; and
    (b) means, connected to the means for supporting, for following the template.

12. The router guide according to claim 8 wherein the template means comprises:
    (a) a template; and
    (b) means, connected to the means for supporting, for following the template.

13. A router guide, for use in conjunction with a router, for routing a workpiece comprising:
    (a) support means for supporting the router over the workpiece;
    (b) first means for allowing motion of the support means in a direction parallel to a first axis;
    (c) second means for allowing motion of the support means in a direction parallel to a second axis, the combination of the first and second means allowing the router to be positioned over any point of the workpiece within a range;
    (d) means for vertically positioning the support means at a plurality of levels within a vertical range;
    (e) a template; and
    (f) means connected to the support means for following the template.

14. The router guide according to claim 13 wherein the support means comprises:
    (a) a rigid platform of sufficient strength to support a router;
    (b) a mounting adapter comprising an area of the platform for removeably mounting a router, the adapter defining a hole through which a router tool can pass; and (c) a plurality of support arms rigidly connected at one end to the platform and at the other end to the first means.

15. The router guide according to claim 14 wherein the first means comprises:

(a) a plurality of parallel first guide bars, the ends of which are slidably mounted on the second means for reciprocal movement; and (b) a plurality of guides rigidly connected to the support arms and slidably mounted on the first guide bars for reciprocal movement along the first guide bars.

16. The free flowing router guide of claim 15 wherein the second means comprises a plurality of parallel second guide bars on which the ends of the first guide bars are slidably mounted.

17. The router guide according to claim 13 wherein the means for vertically positioning comprises:

(a) a plurality of legs connected to and supporting the second means; and (b) means for adjusting the vertical heights of the legs.

18. The router guide according to claim 16 wherein the means for vertically positioning comprises:

(a) a plurality of legs connected to and supporting the second guide bars; and (b) means for adjusting the vertical heights of the legs.

* * * * *